United States Patent [19]

Watanabe et al.

[11] Patent Number: 5,518,355

[45] Date of Patent: May 21, 1996

[54] AUTOMATED CONTAINER TRANSFERRING AND LOADING SYSTEM AND A METHOD THEREFOR

[75] Inventors: Toshiyuki Watanabe; Shigeaki Kohnosu; Katsuyoshi Ohshima; Masayuki Ogawa; Yoshihiko Kaneko, all of Tokyo, Japan

[73] Assignees: All Nippon Airways Co., Ltd.; Zennikku Motor Service Co., Ltd.; Sanki Engineering Co., Ltd., all of Tokyo, Japan

[21] Appl. No.: 101,073

[22] Filed: Aug. 4, 1993

[30] Foreign Application Priority Data

Aug. 4, 1992 [JP] Japan ...................................... 4-226515

[51] Int. Cl.[6] .................................................. B65G 57/20
[52] U.S. Cl. ............................ 414/396; 198/721; 414/531
[58] Field of Search ............................. 198/721; 414/395, 414/396, 400, 531

[56] References Cited

U.S. PATENT DOCUMENTS

| | | | |
|---|---|---|---|
| 2,756,870 | 7/1956 | Clark et al. ............................ | 198/721 |
| 2,812,080 | 11/1957 | Campos ................................. | 414/531 |
| 3,042,232 | 7/1962 | Olsson .................................. | 414/531 |
| 3,684,108 | 8/1972 | Olson ................................... | 414/531 |
| 4,005,787 | 2/1977 | Sleep .................................... | 414/395 |
| 4,787,808 | 11/1988 | Shimoji et al. ......................... | 414/531 |
| 4,850,783 | 7/1989 | Maekawa ............................... | 414/396 |

FOREIGN PATENT DOCUMENTS 63-35527  7/1988  Japan .

*Primary Examiner*—David A. Bucci
*Assistant Examiner*—Thomas J. Brahan
*Attorney, Agent, or Firm*—Jacobson, Price, Holman & Stern

[57] ABSTRACT

An automated container transferring and loading system having a large number of carriage retracting lanes disposed orthogonally with respect to a row of stage conveyors of a cargo sorting yard, a carriage tow device for retracting a plurality of connected carriages into the carriage retracting lane, at least one group of stopper operation devices for locking and unlocking cargo stoppers on the carriages which are parked in the lane, and a pusher device capable of sliding longitudinally up and down the carriage retracting lanes for unloading containers on the carriage which are released by the cargo stoppers thereof and for loading a container from the stage conveyor onto the carriage.

22 Claims, 15 Drawing Sheets

AUTOMATED CONTAINER TRANSFERRING AND LOADING SYSTEM AND A METHOD THEREFOR

FIELD OF THE INVENTION

The present invention relates to a system for transferring and loading a large number of cargo containers to or from a carriage in a cargo sorting yard.

BACKGROUND OF THE INVENTION

With regard to the sorting of cargo containers with every flight and classifying arriving cargo containers according to address at a cargo collection and delivery facility and in a cargo facility at an airport, the operation of transferring and loading a large number of cargo containers to or from carriages, typically depends on human handling.

The conventional cargo handling systems are very inefficient and cannot be operated in a short period of time, and this, in turn, results in increased costs. There is a need for a more efficient cargo handling systems, especially since there is a great demand for air cargo and because increasing personnel is not necessarily cost effective. Although the same carriages have been used in conventional cargo handling systems, after the prolonged use thereof the stop position of each operation lever after the cargo stopper of a carriage was locked, differ from one another due to the reason that the fall angle of the operation lever and the height of the lever shaft at stopping are so irregular. Therefore, the automated system for releasing the stoppers by rotating the stopper operation levers has been unable to be realized.

SUMMARY OF THE INVENTION

The primary object of the present invention is to provide an improved system for transferring and loading containers automatically at a cargo sorting yard to and from a carriage.

Another object of the present invention is to provide an installation capable of detecting the position of a stopper operation lever for a carriage stopper and capable automatically locking or unlocking the cargo stopper.

To achieve these and other objects, an automated containerized cargo transferring and loading system comprises a plurality of carriage retracting lanes which are orthogonally disposed with respect to a row of stage conveyors; a tow device by which a plurality of connected carriages are retracted into a carriage retracting lane; at least one stopper operation device for locking and unlocking cargo stoppers on the carriages which stop in the lane; and a pusher device capable of sliding longitudinally up and down the carriage retracting lane, capable of unloading containers located on carriages which stop in the lane to the stage side (which unlocking occurs toward the stage conveyor), and capable of loading containers from the stage conveyor onto the carriage.

The stopper operation device comprises a carriage which travels in parallel with the carriage tow device, an actuation device for reciprocating the carriage of the stopper operation device, a device for automatically detecting the position of the stopper operation lever of a carriage and a finger turning unit for rotating the stopper operation lever. The finger turning unit includes a slightly shifted set of fingers for rotating the stopper operation lever of the carriage, and a finger rotating device.

The carriage tow device includes a trolley which is propelled by a chain disposed in a lane pit. A projection which extends up from an end of the trolley protrudes up through a central slit in a floor board and is engaged to a tow bar connecting plate of the carriage. As detailed embodiments of the present invention will be described hereinafter, the applicant discloses in Japanese Patent No. 1,489,094 (Japanese Patent Publication No. Sho 63-35527) a system in which a shaft extends up from an end of the trolley, a tow projection is supported on a bracket of the shaft, an end of the tow projection is urged upwardly by a spring provided at the outside of the shaft, and a lever is attached to release the engagement of the tow bar and the tow projection when the tow projection reaches an origin of the retracting lane. It is to be understood that the disclosed embodiments are merely exemplary of the invention and the details disclosed herein are not to be interpreted as limiting to the embodiments which are shown by drawings.

With regard to propelling the carriage tow device, the stopper operation device and the automated transferring and loading device, the present invention is not limited to chain actuation, but rather it is possible to actuate these devices by a wire, a rack and pinion and a linear motor, or alternatively by a self-propelled mechanism.

The pusher device comprises a trolley which travels on a line opposite from the stopper operation device with the carriage tow device running between and in parallel with those devices; an actuation device to reciprocate the trolley; a paddle arm provided on the trolley; and a paddle arm turning unit to pivot the paddle arm from a horizontal orientation to a perpendicular orientation and vice versa. A stopper operation lever position detecting device comprises a striker provided at the carriage side and a detector for detecting at least the planar position of the stopper operation lever which abuts the striker. It is possible, however, to make the detector an anti-contact type.

When the height of the stopper operation lever becomes much different with every carriage, in addition to the detector for the planar position of the lever, there is a stopper operation lever height position detecting device. A finger turning unit height adjusting device is assembled with this detecting device. When the height accuracy of the carriage stopper operation lever remains within a certain range, however, it is possible to eliminate the detection of the stopper operation lever height position and the adjustment of the finger turning unit height.

In a method for automatically transferring and loading containerized cargo according to the present invention, a plurality of carriage trains on which containers are loaded and are supported by the stoppers, are retracted into the carriage retracting lane at the cargo sorting yard. The stopper operation lever position on the carriage is detected by a sensor arranged on the stopper operation device, which device is capable of running longitudinally up and down the carriage retracting lane. The fingers of the stopper operation device are caused to engage the operation lever by a signal from this sensor and are rotated to release the stopper on the carriage. The paddle arm is also capable of running longitudinally up and down the carriage retracting lane and can be brought into contact with the rear side of a container to unload it to the cargo sorting yard. For loading containers, a plurality of carriages on which no containers are located are retracted into the carriage retracting lane. Next, the stopper operation lever position is detected by the sensor arranged on the stopper device which can run along the longitudinal direction. The fingers of the stopper operation device are caused to engage the operation lever by a signal from the sensor and are rotated to release this stopper only. The paddle arm of the pusher device which can run along the longitudinal direction is then brought into contact with the rear side of the container which is ready at the cargo sorting place to be loaded onto the carriage. After the container is loaded onto the carriage, the container is stabilized by the stoppers using the stopper operation device, and the pusher device is simultaneously retracted to its original position toward the cargo sorting yard. The foregoing process is then repeated until all containers have been sequentially loaded onto the carriage.

A plurality of carriage trains (6 trains, for example) are propelled by a tug truck to the carriage retracting lane, are latched to the tow projection, and are retracted into the carriage retracting lane toward the cargo sorting yard by the carriage tow device. Using the sensor of the stopper operation device side of the detector which is provided on the side of the carriage, the position and the height of the stopper operation lever with respect to the carriage retracting direction is detected. With this information, the fingers are positioned correctly with respect to the stopper operation lever and are moved laterally to engage the lever. Thereafter, the finger turning unit is actuated to turn the fingers by a predetermined angle. The stopper of the carriage is thereby released. The paddle arm of the pusher device is then rotated to contact the rear side of the container, and the pusher propelling device is actuated to unload the container from the stage conveyor. Contrary to the above, the container positioned on the stage container is pushed forward by the paddle arm and is loaded onto the carriage.

The above and other objects, features and advantages of the present invention will become apparent from the following description and the appended claims taken in conjunction with the accompanying drawings which show by way of example preferred embodiments of the present invention and in which like component parts are designated by like reference numerals throughout the various figures.

DESCRIPTION OF THE PREFERRED EMBODIMENTS

Figure 1:
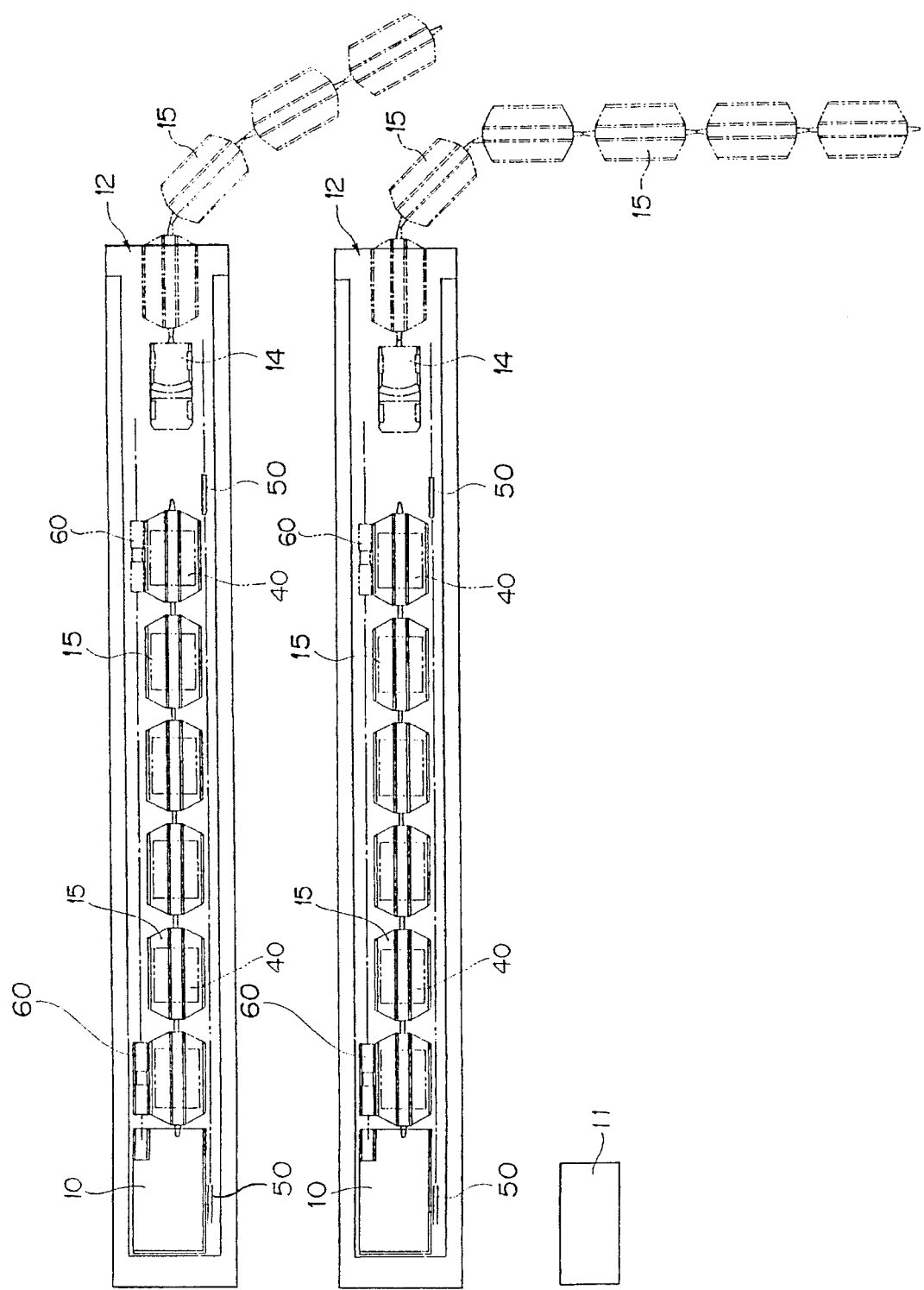
FIG. 1 is a plan view illustrating the preferred embodiment of the automated container transferring and loading system according to the present invention.

The present invention will now be described in detail with reference to the drawings. Referring first to FIG. 1, there is shown a container handling system, and in particular, a containerized cargo transferring and loading system for a cargo facility at an airport.

In the illustrated system of transferring and loading containerized cargo onto or from a carriage, containers 40 of air cargo are unloaded onto a stage conveyor 10 at the cargo sorting yard where they are to be classified and transferred, or alternatively, containers 40 from the stage conveyor are loaded onto the carriage. A carriage retracting lane 12 is provided to retract the carriage 15 along the buffer conveyor (not shown) extending from one side of the stage conveyor 10. Preferably, there are several stage conveyors arranged next to one another to define a row of stage conveyors. Though only one retracting lane is illustrated, a plurality of lanes 12 are disposed at the stage conveyors 10 and extend out from the stage conveyors 10 orthogonally with respect to the row. The stage conveyor 10 is preferably connected to a plurality of transversely oriented conveyors for storing and classifying containers. In FIG. 1, the device 11 is used to retract the carriage 15 and to operate the stopper operation device and the pusher device or the like which will be described hereinafter.

Figure 2:
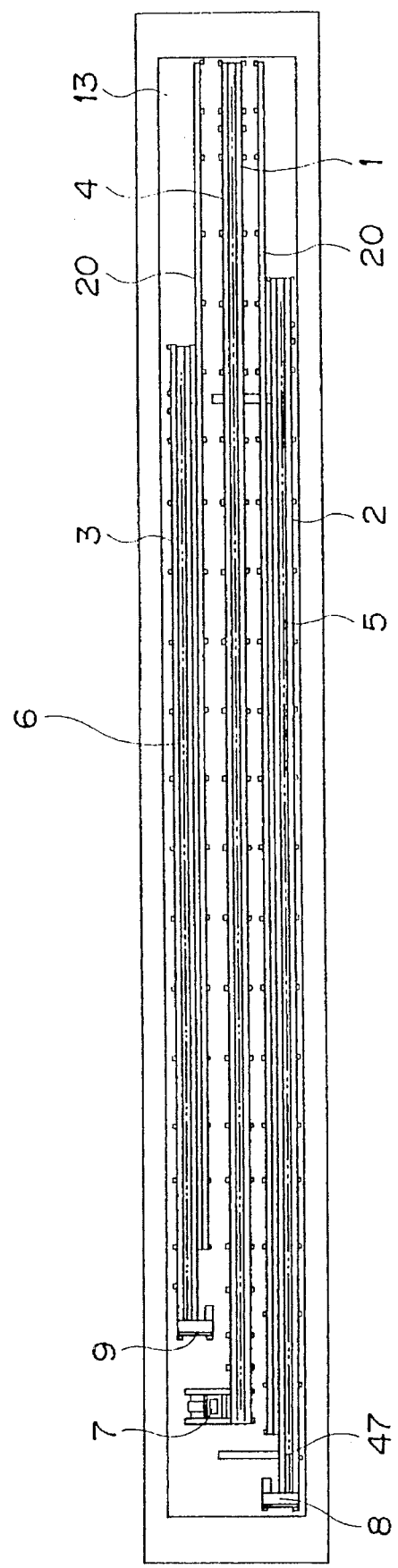
FIG. 2 is a plan view illustrating the system according to the present invention in which the floor board of the carriage retracting lane of FIG. 1 is eliminated.
Figure 6:
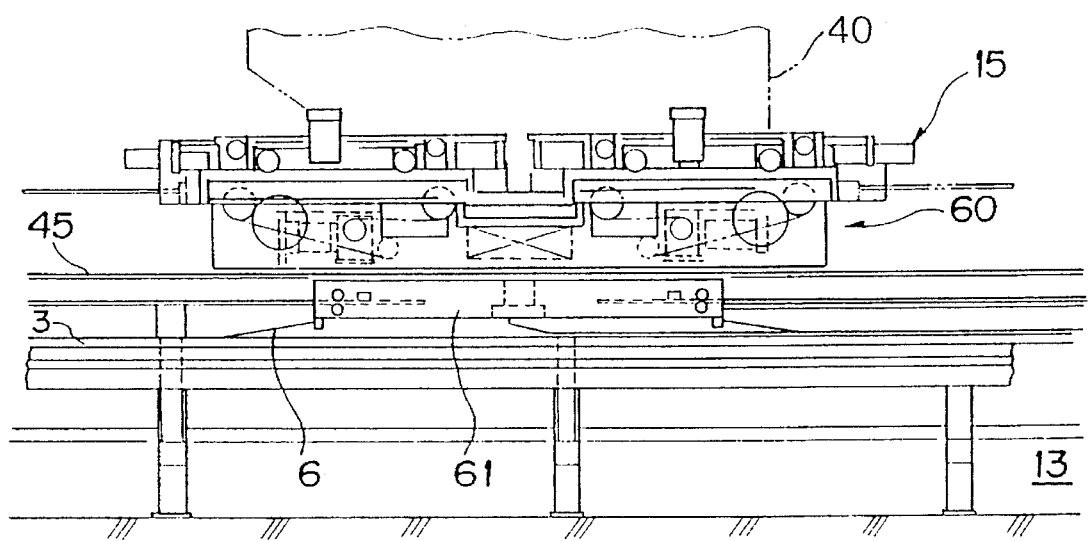
FIG. 6 is a left side elevation view illustrating the system of FIG. 3.
Figure 7:
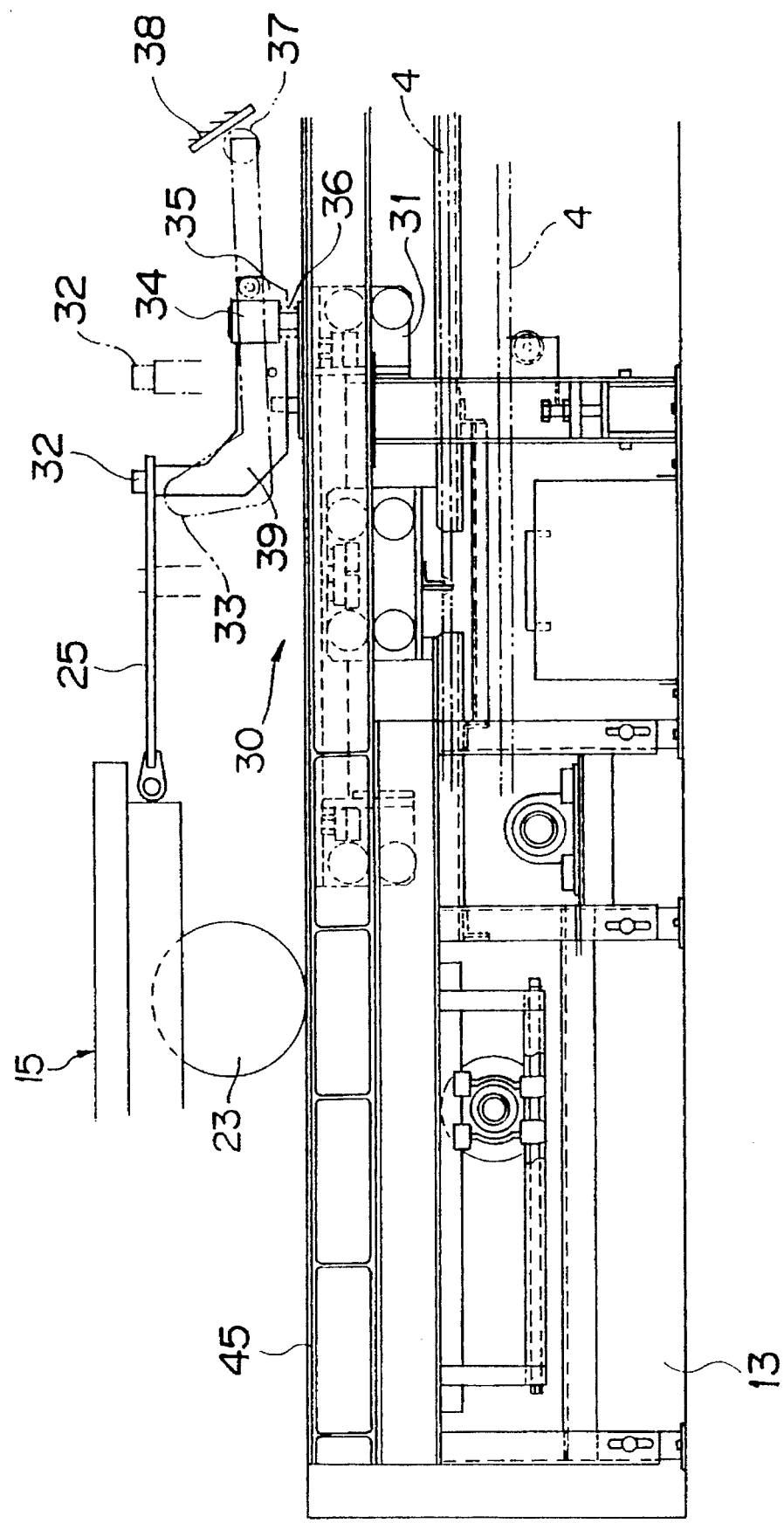
FIG. 7 is an enlarged side view illustrating the carriage tow device of the system.

FIG. 2 is a plan view of the system in which the floor board of the carriage retracting lane 12 is eliminated. A pit 13 is provided coextensively under the carriage retracting lane 12. The pit 13 includes three longitudinally arranged rails 1, 2, 3 and two carriage weight supporting columns 20, both of which are also coextensive with the retracting lane 12. The first rail 1 is arranged at the center of the pit 13 to guide the carriage tow device 30 (FIG. 4 and FIG. 7). The second and the third rails 2, 3 are adjacent to the columns 20 and are used to guide a pusher device 50 and a stopper operation device 60 (FIG. 1 and FIG. 3 to FIG. 6) respectively.

Chains 4, 5, 6 are respectively received within the rails 1, 2, 3 and are used to propel the carriage tow device 30, the pusher device 50, and the stopper operation device 60, respectively. A chain driving device 7, 8, 9 is connected to an end of each chain 4, 5, 6. It should be noted that the present invention is not limited to the illustrated chain drive mechanism. The devices 30, 50, 60, for example, can be actuated by a wire, a rack and pinion or a linear motor, or alternatively can be designed to be self-propelled.

CARRIAGE

A preferred embodiment of the carriage will now be described.

Figure 3:
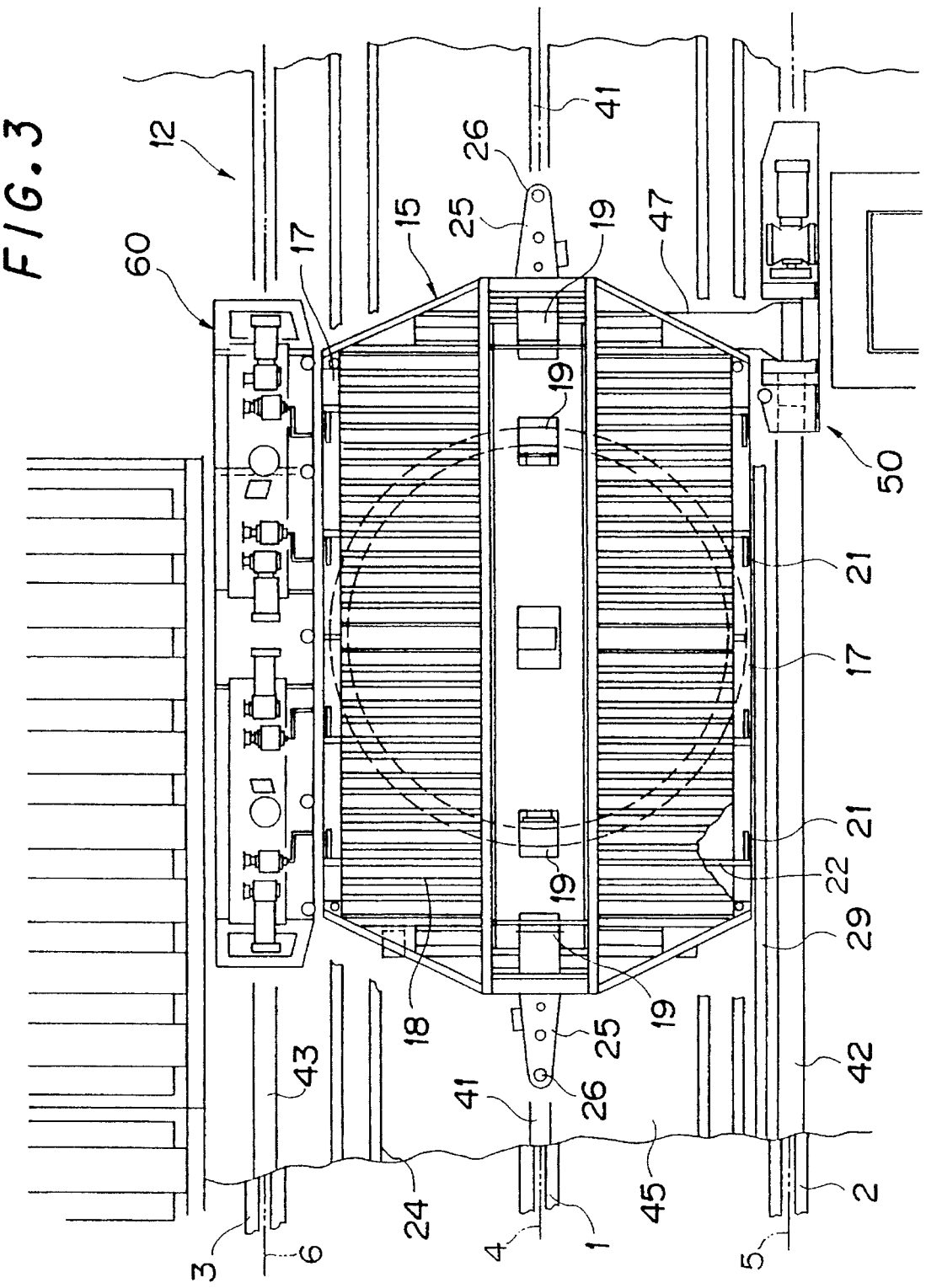
FIG. 3 is an enlarged plan view illustrating the preferred embodiment of the system of FIG. 1.
Figure 4:
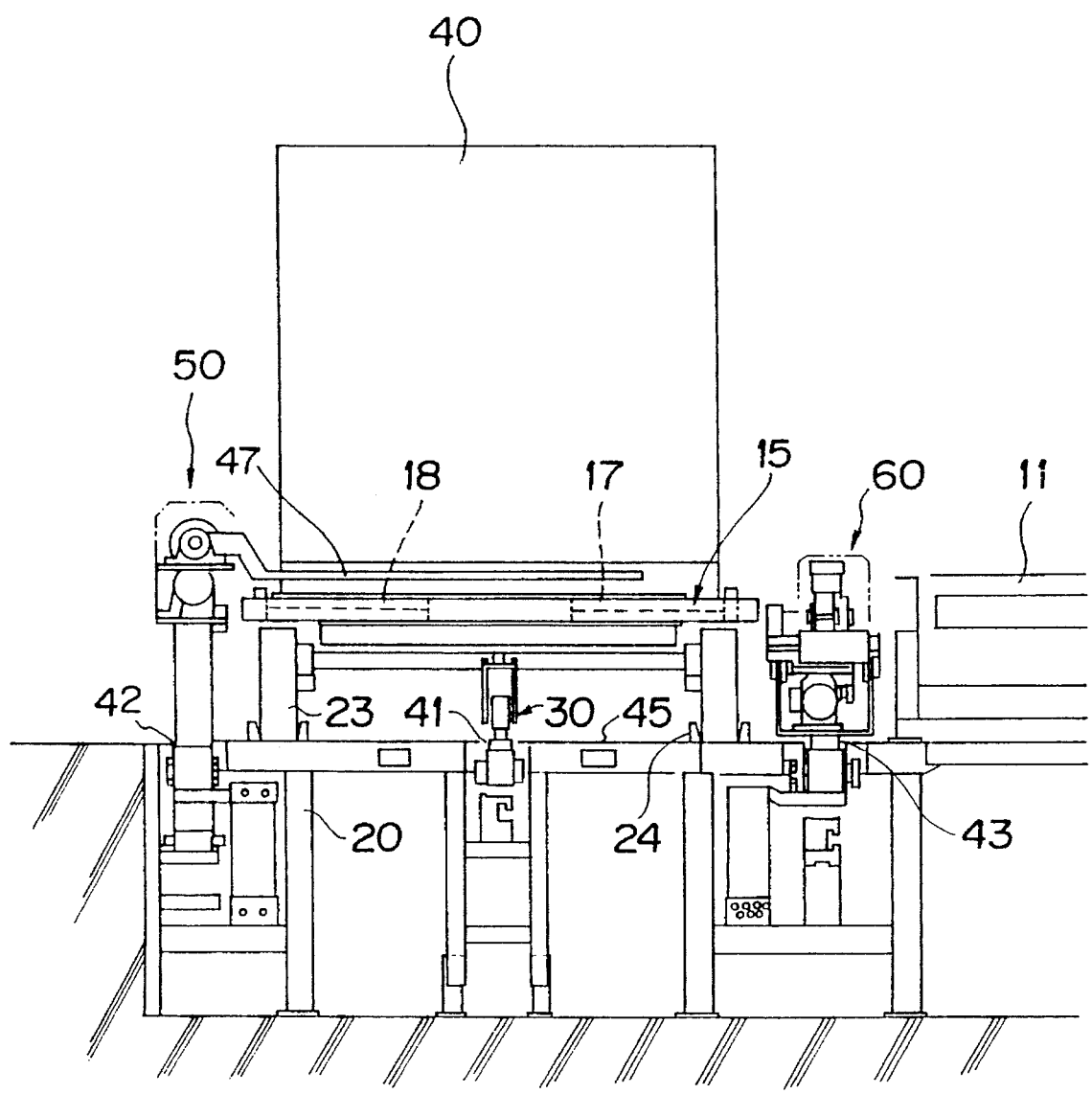
FIG. 4 is a front view illustrating the system of FIG. 3.
Figure 5:
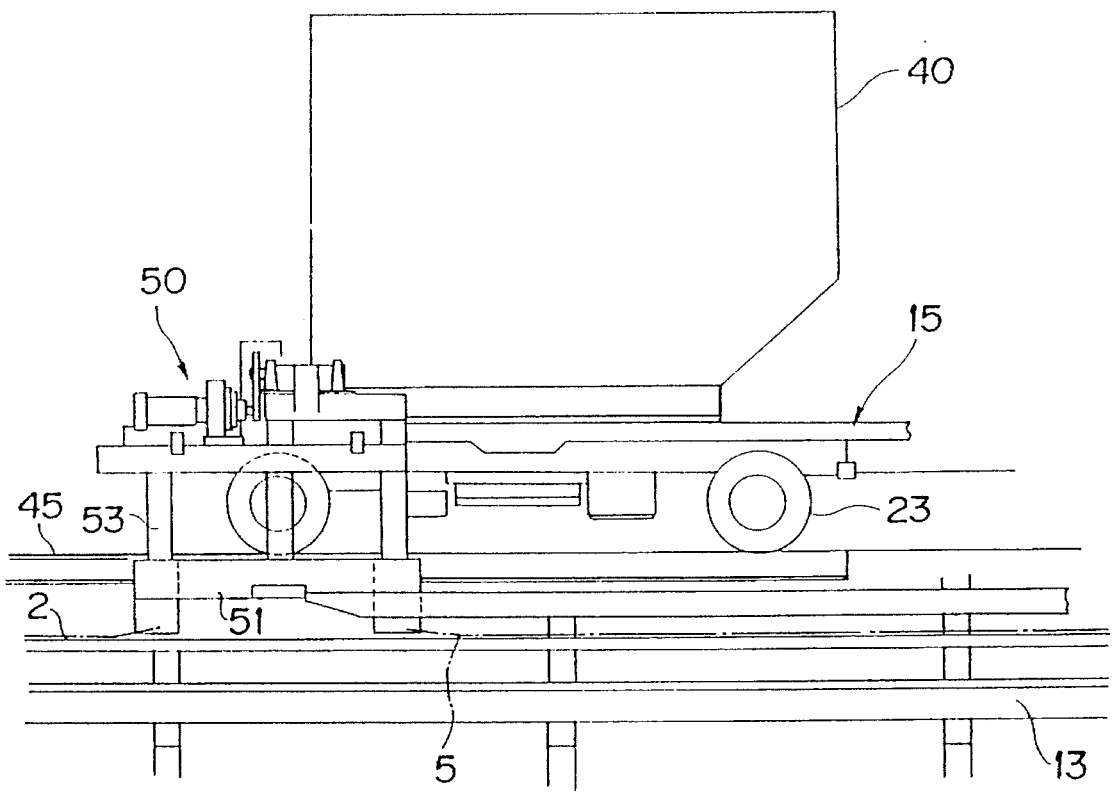
FIG. 5 is a right side elevation view illustrating the system of FIG. 3.

FIG. 3 is an enlarged plan view illustrating the carriage which is retracted into the carriage retracting lane; FIG. 4 is an enlarged front view thereof; and FIGS. 5 and 6 are a right side view and a left side view, respectively, of the carriage.

In each carriage 15, a plurality of rollers 18 are disposed parallel to one another in a turn table 17. In addition, several sets of stoppers 19, 19 (FIG. 3 illustrates 2× 2, 4 stoppers in total) are liftably disposed at spaces between certain rollers in positions corresponding to edges of the container so that chattering of the container can be prevented. Corresponding to the positions of the stoppers, are stopper operation levers 21 which are attached on both sides of the frame of the turn table 17. A shaft 22 of the operation lever 21 extends parallel to the rollers 18 to connect with each stopper. Tow bar connecting plates 25 are disposed forward and aft of the carriage 15. Each of the tow bar connecting plates has apertures 26 for engaging a towing projection and for connecting and towing the carriage 15. While the figures illustrate that the wheels 23 are guided by wheel guides 24 provided along a floor board 45, it is possible to eliminate the wheel guides 24 in the event that each carriage is towed linearly by a tow device 30.

CARRIAGE TOW DEVICE

The carriage tow device will now be described.

FIG. 7 is an enlarged side view illustrating a carriage tow device similar to that disclosed in Japanese Patent Publication No. Sho 63-35527. In particular, tow projections 32 protrude from a slit 41 running down the longitudinal center of the floor board 45 (FIG. 3, FIG. 4) and engage the traction bar or connecting plates 25, on trolleys 31, to thereby tow the carriage. A releasing lever 33 is attached near the connecting plate 25 to release the engagement of the plate 25 and the tow projection 32. The trolley 31 travels on a rail and is propelled by the chain 4 which is actuated by the chain actuating device 7. A short pole 34 stands on an end of the trolley 31. A tow fitting 39 is mounted on a bracket 35 which is disposed on the pole 34, so that the distal end of the tow fitting 39 is urged upwardly by a spring 36 disposed at the pole 34. This way, the tow projection 32 always tends to engage the aperture 26 of the tow bar connecting plate 25.

A release lever 33 is provided to release the engagement of the tow bar connecting plate 25 and the tow projection 32 when the carriage 15 reaches the origin of the retracting lane 12. A roller 37 is mounted on an end of the releasing lever 33 so that when the release lever is to be actuated, a cam plate 38 contacts the roller 37. It should be noted that the carriage tow device is not limited the device illustrated in the drawings. For example, as disclosed by Japanese Patent Publication No. Sho 63-35527, it is possible to use a compact type towing projection in which the release lever 33, the spring 36, the roller 37 and the cam plate 38 contacting the roller 37 are eliminated therefrom.

In operation, a plurality of connected carriages 15 travel into the carriage retracting lane 12 and are retracted toward the origin of the retracting lane 12 (the inner most point of the lane) by the chain 4 in the lane 12. Initially, however, a plurality of carriage trains (6 trains for example) are dispatched to an aircraft, and containers 40 of cargo are transferred and loaded onto each carriage 15. The containers 40 are prevented from chattering by operating the stopper levers 21 to deploy the stoppers 19. Thereafter, the carriage 15 is brought near the lane 12 by a tug truck 14, and the tug truck 14 is separated at the entrance of the lane 12. The separated carriage 15 is retracted into the lane 12 by the tow device 30 and the containers are subsequently unloaded onto the stage side as described hereinafter. For departing containers 40, the containers 40 from the cargo sorting stage are loaded onto the appropriate carriage, and the carriage is dispatched to the appropriate aircraft.

PUSHER DEVICE

The pusher device will now be described.

Figure 8:
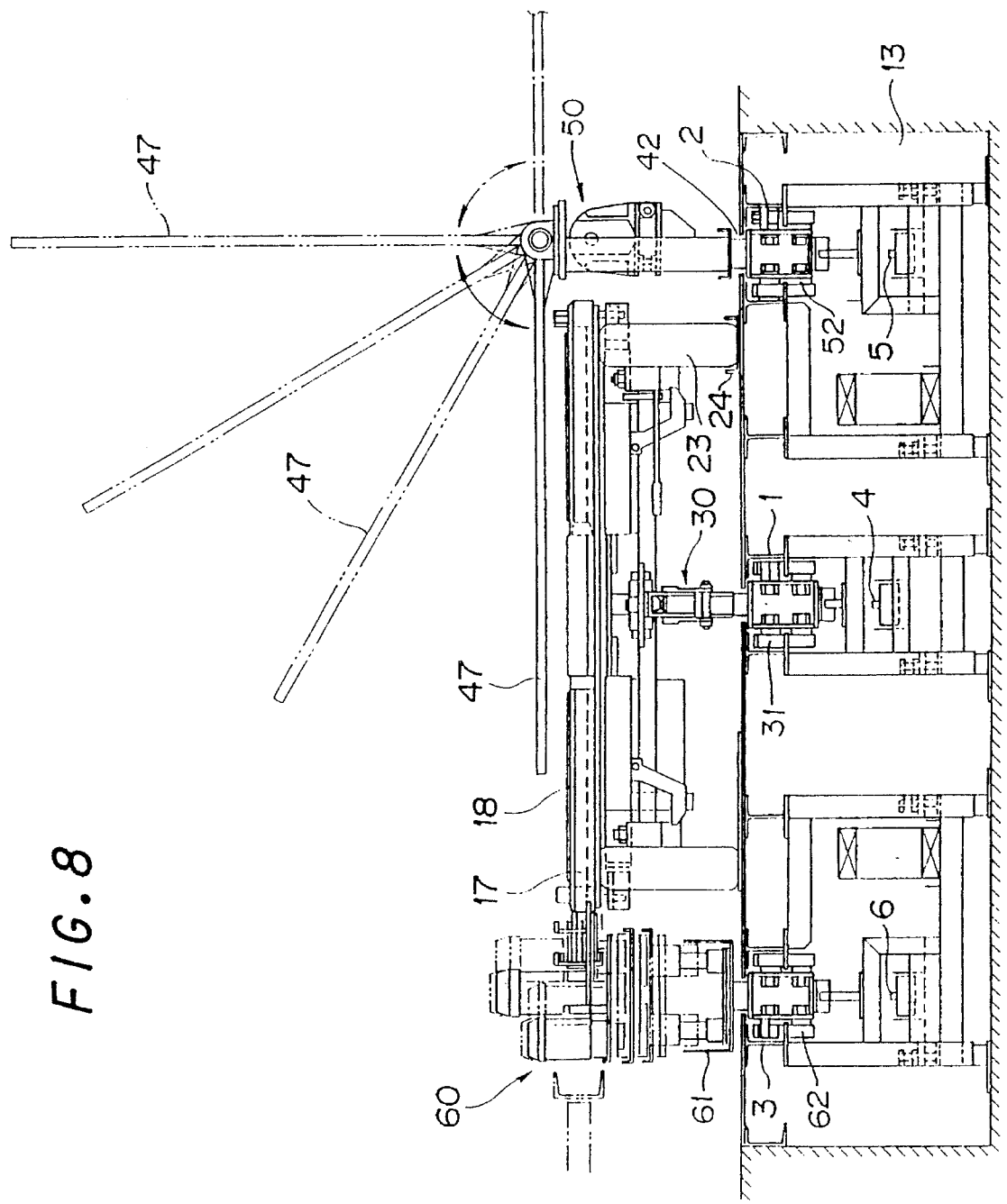
FIG. 8 is an enlarged front view illustrating the pusher device of the system.
Figure 9:
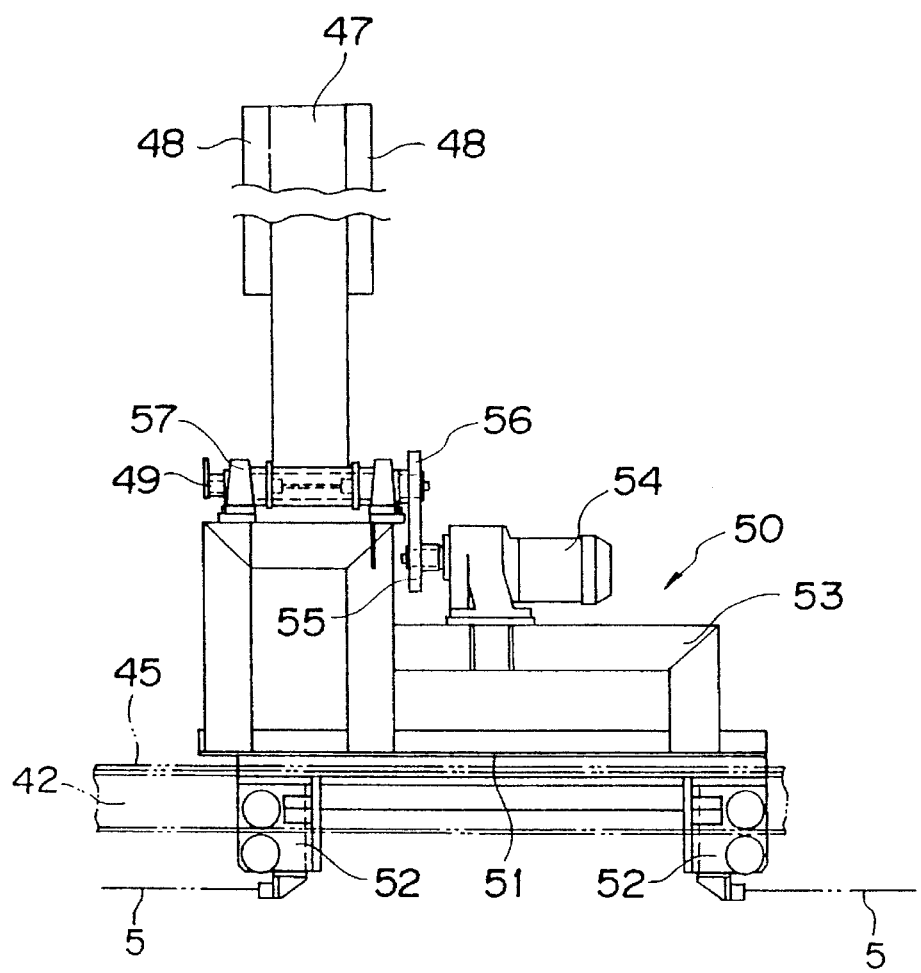
FIG. 9 is an enlarged side view illustrating the paddle arm rotating device of the system.

FIG. 8 is an enlarged front view illustrating a pusher device 50 for transferring and loading containers, and FIG. 9 is a side view illustrating a paddle arm pivoting device. The pusher device 50 is movable longitudinally up and down the carriage retracting lane 12 and includes a paddle arm 47. The paddle arm 47 is perpendicularly oriented with respect to the ground when the device is moving and is pivoted toward a horizontal orientation to push the rear side of the container therewith for transferring it onto the stage side when the pusher device locates at the position adjacent to the container loaded on the carriage which is stopped in the lane, or for loading the container from the stage side onto the carriage. A frame 53, a geared motor 54 and the paddle arm 47 which is supported by a turning shaft 49, are provided on a travelling base 51. The paddle arm 47 can be designed to pivot about a 180° angle so that it can be shared by two adjacent carriage retracting lanes.

The pusher device as a whole extends over the floor surface through the slit 42 (FIG. 3, FIG. 8) provided on the floor board 45 directly above the rail 2. As FIG. 9 illustrates, two roller slide units 52 are provided under the travelling base 51 and have a plurality of rollers respectively engaging the rails 2. The end of the chain 5 is secured on a bracket under the roller slide unit and the whole pusher device is propelled down the lane by the chain actuating device 8 (FIG. 1). The frame 53 is provided on the travelling base 51 and is used to mount the geared motor 54. The output shaft of the geared motor 54 is connected via gears 55,56 to the rotatable shaft 49 which is supported by a bearing 57. The paddle arm 47 pivots to a perpendicular orientation with respect to the ground whenever the paddle arm travels up or down the lane 12, and is secured on the turning axis 49. The fore and aft surfaces of the puddle arm 47 are provided with patches 48 which contact the outer wall of the container 40 when the pusher is caused to advance.

In a modified type of the pusher device, a plurality of lines of paddle arm units are hung in a ceiling loop form and respective paddle arm units are each propelled by a motor (not shown). The loading and unloading process is thus expedited and the working efficiency is improved so that a longitudinal row of a large number of containers can be loaded and unloaded.

STOPPER OPERATION DEVICE

The stopper operation device 60 will now be described.

Figure 10:
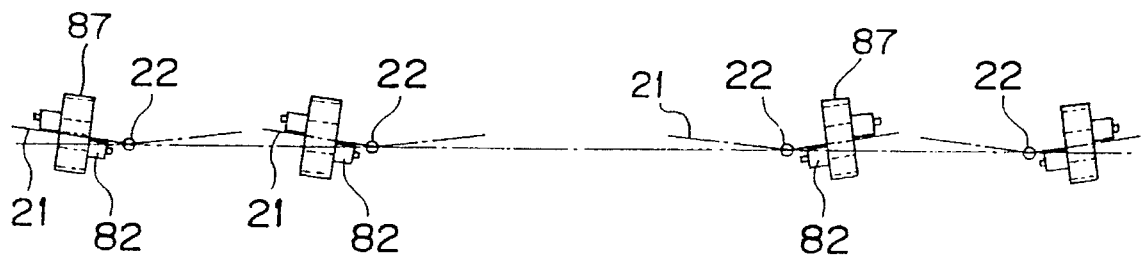
FIG. 10 is a side view illustrating a relationship between the stopper operation lever and the finger turning unit of the system.

As was mentioned above with regard to the embodiment illustrated in FIG. 3, a group of rollers 18 are disposed in a turn table 17 on the carriage 15, and several stoppers 19,19 are liftably disposed in spaces between certain rollers of said group of rollers 18 to thereby prevent the containers from chattering. Corresponding to these stoppers, are each four stopper operation levers 21 attached to either sides of the frame of the turn table 17. The stopper operation device 60 is to rotate the stopper operation levers 21 of the carriage which is stopped on the lane to thereby release or actuate the stoppers 19 or to stop the container. FIG. 10 illustrates the relation of the stopper operation lever 21 and a finger unit 82 in an unlocking condition of the stoppers 19 in which the left side two levers and the right side ones rotate oppositely with respect to each other and respective finger units 82 are set to approach and engage to the contrary position at both sides.

Figure 11:
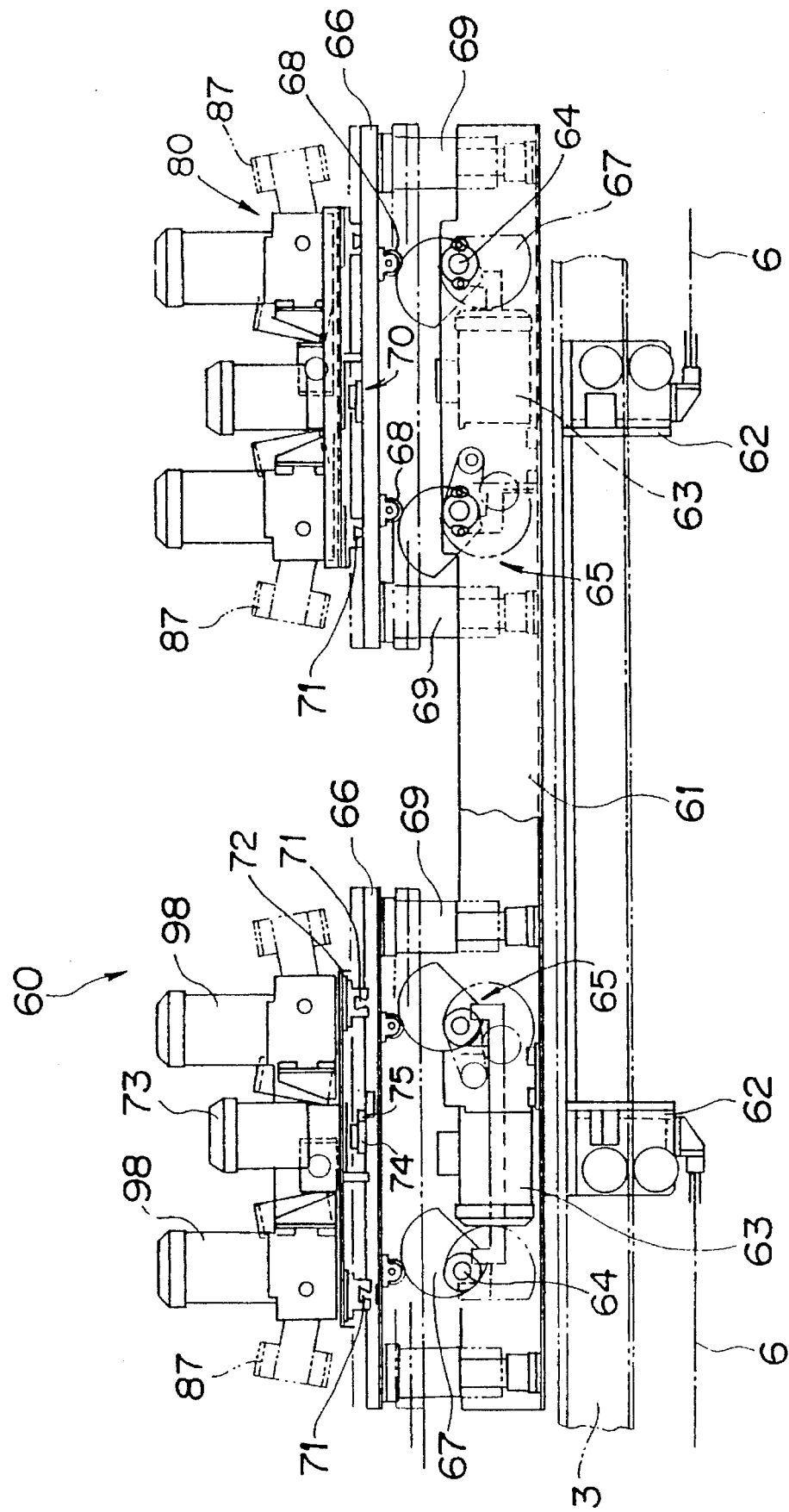
FIG. 11 is an enlarged side view illustrating the stopper operation device of the system.
Figure 12:
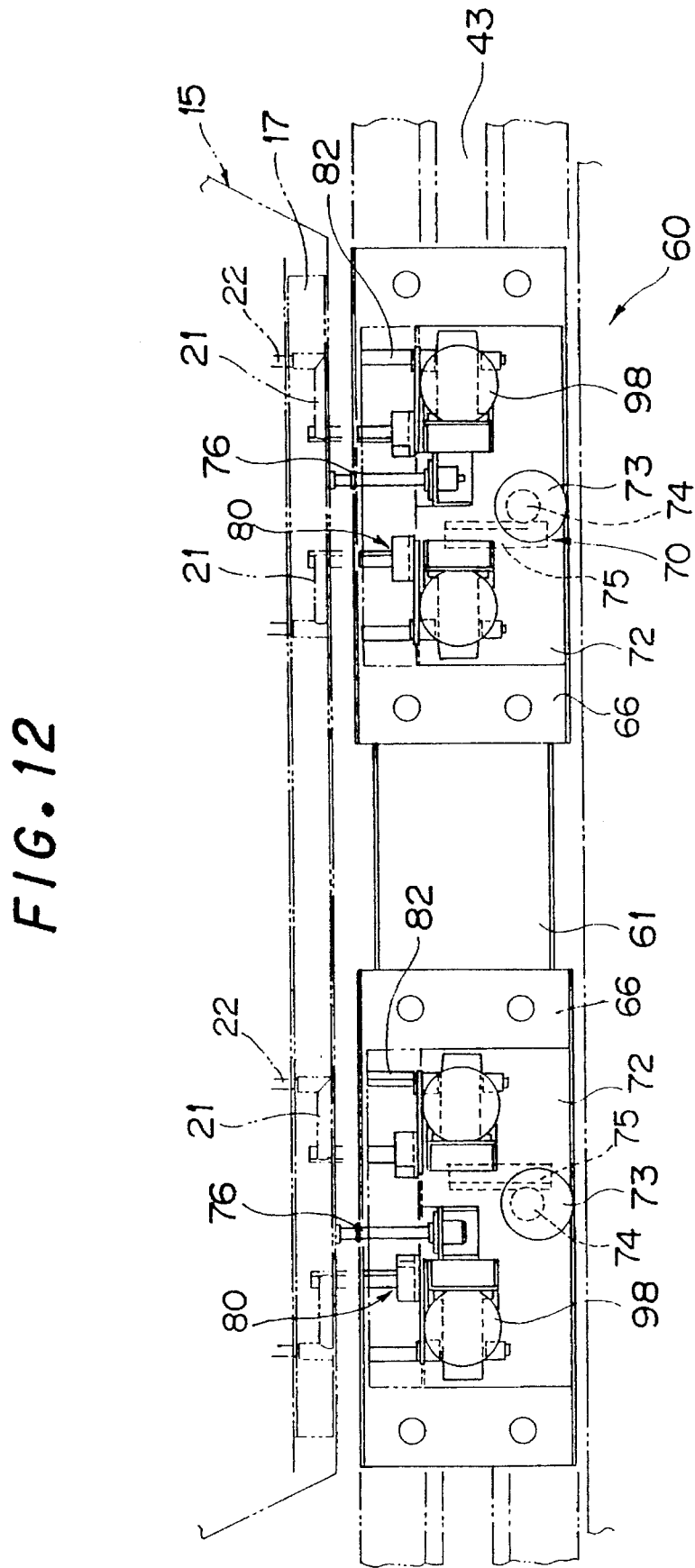
FIG. 12 is a plan view illustrating the stopper operation device of FIG. 11.
Figure 13:
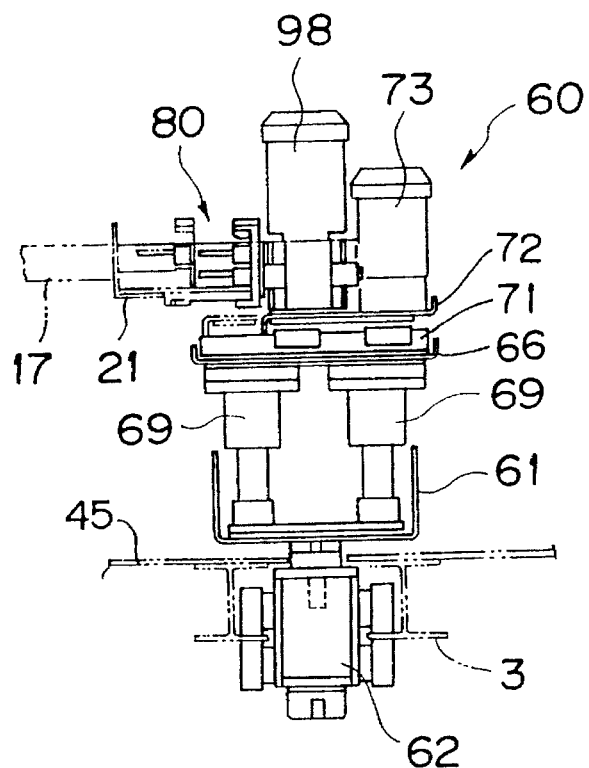
FIG. 13 is a front view illustrating the stopper operation device of FIG. 11.

FIG. 11 is an enlarged side view illustrating the stopper operation device; FIG. 12 is a plan view illustrating the device of FIG. 11; and FIG. 13 is a front view illustrating the device of FIG. 11.

The stopper operation device 60 is movable longitudinally up and down the carriage retracting lane to engage the stopper rotating finger with the stopper operation lever 21 properly before unloading cargo containers which had been loaded on the carriage parked in the lane. The device 60 comprises of a travelling base 61, an elevation mechanism 65, an elevation base 66, a sliding mechanism 70 and a finger turning unit 80. Substantially the entire device extends out from a slit 43 (FIG. 3) provided on the floor board 45 directly above the rail 3. Two roller sliding units 62 are mounted under the travelling base 61 and have a plurality of rollers which are used to engage the rail 3. The end of the chain 6 is secured to the bracket under the unit and the whole device is propelled by the chain actuating device 9 (FIG. 2). A pair of elevation mechanisms 65, elevation bases 66 and sliding mechanisms 70 are respectively provided on both sides of the common travelling base 61. The elevation bases 66 are supported by four dampers 69 which are vertically oriented on the travelling base 61. Two finger turning units 80 are arranged on the upper surface of the elevation bases 66 (FIG. 11 to FIG. 13).

ELEVATION MECHANISM

The elevation mechanism comprises a geared motor 63 mounted on the travelling base 61, a rotation shaft 64 connected to the output shaft of the geared motor 63, a cam plate 67 secured to the end of the rotation shaft 64 and inverted rollers 68 provided under the base 66 to contact the cam plate 67. The position of the stopper operation lever 21 at the side of the carriage and its height from the floor surface are confirmed by a position detecting unit 100 (FIG. 20, FIG. 21) and a height detecting device 105 (FIG. 22). When there is a gap between the lever 21 and the finger unit 82, the geared motor 63 is actuated to rotate the cam plate 67 and the elevation base 66 is thus elevated.

SLIDING MECHANISM

The sliding mechanism 70 actuates the finger turning unit 80 and causes it to move in a transverse direction and to properly engage the finger on the elevation base 66 to the operation lever 21. Several guides 71 are mounted on the elevation base 66 and a slide base 72 is disposed thereon (FIG. 11). A motor 73 for sliding the unit is mounted on the slide base 72 and a pinion 74 protrudes from under of the slide base 72 to engage with a rack 75 of the elevation base 66. A gaging unit 76 is provided on the slide base 72. A desired distance between the turn table 17 of the carriage and the elevation base 66 is held by the gaging unit 76 provided on the center of the elevation base 66. The motor 73 is actuated to slide the finger turning unit 80 via the pinion 74 and the rack 75 (FIG. 11 to FIG. 13).

FINGER TURNING UNIT

Figure 14:
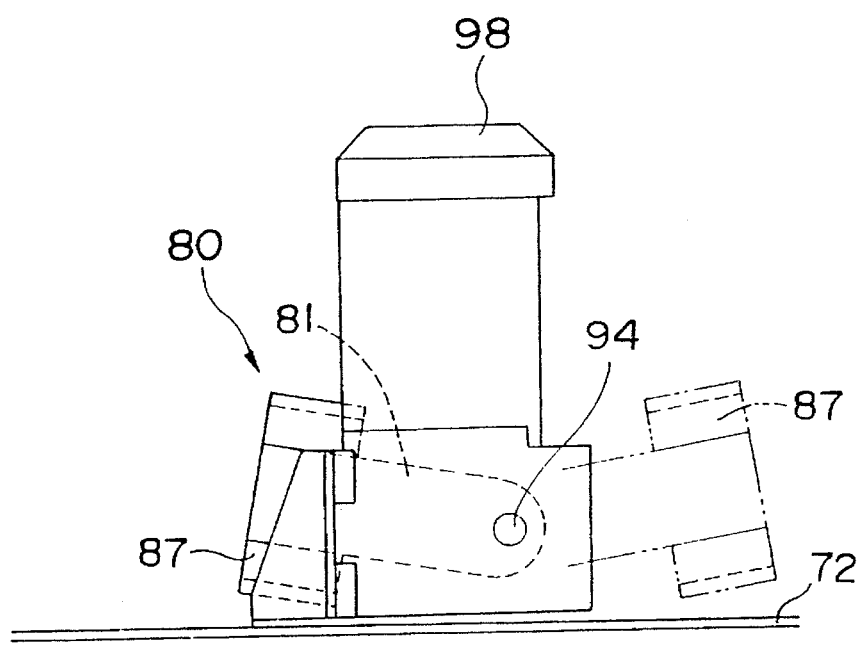
FIG. 14 is an enlarged side view illustrating the finger turning unit of the system.
Figure 15:
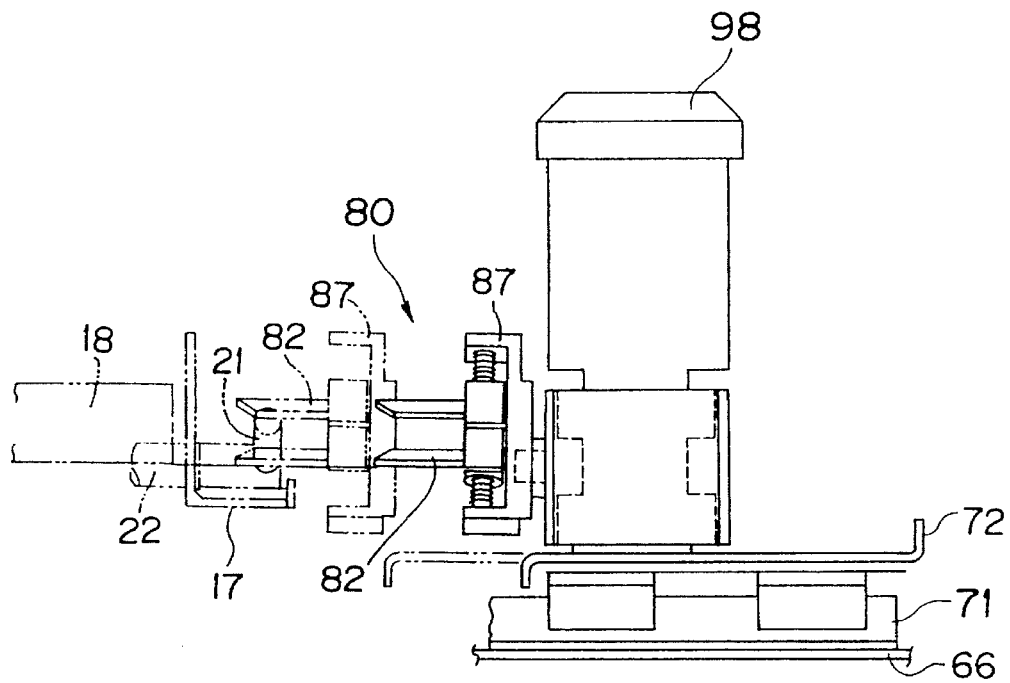
FIG. 15 is a front view illustrating the finger turning unit of FIG. 14.
Figure 16:
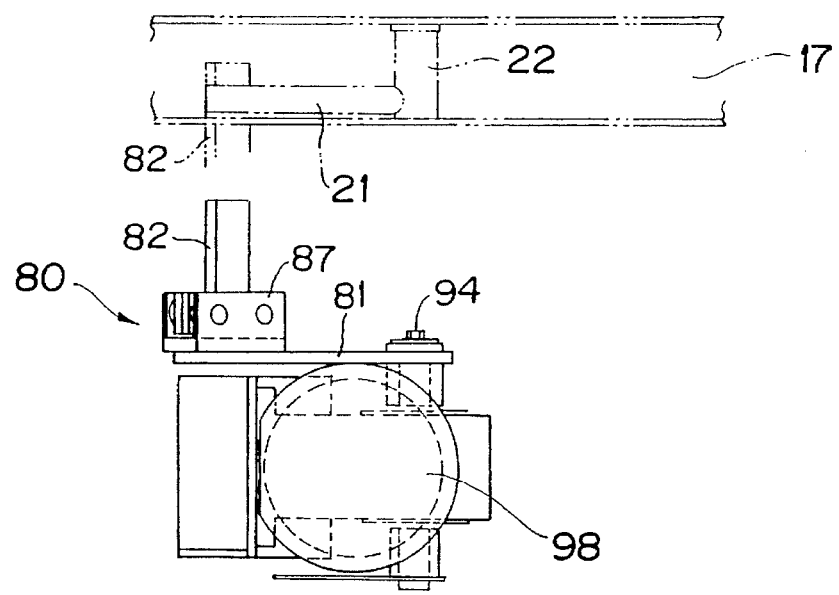
FIG. 16 is a plan view illustrating the finger turning unit of FIG. 14.

FIG. 14 is an enlarged side view illustrating the finger turning unit 80; FIG. 15 is an enlarged front view illustrating the same; and FIG. 16 is an enlarged plan view illustrating the same.

Figure 17:
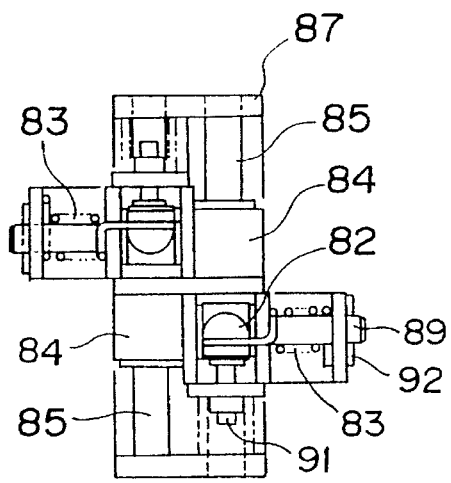
FIG. 17 is an enlarged front view illustrating the finger unit.
Figure 18:
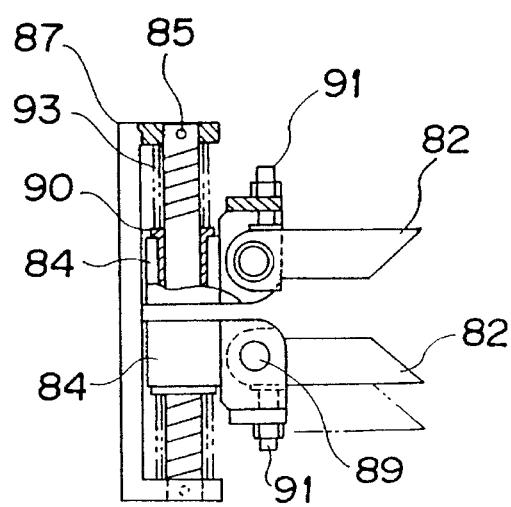
FIG. 18 is a side view illustrating the finger unit of FIG. 17.
Figure 19:
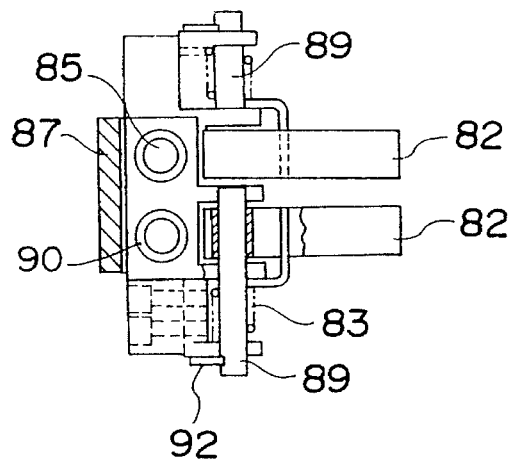
FIG. 19 is a plan view illustrating the finger unit of FIG. 17.

The finger turning unit 80 comprises a geared motor 98 which is provided on the slide base 72, an arm 81 attached to a shaft 94 of the motor 98 and a finger unit provided at the opposite end of the arm 81 from the shaft 94. As illustrated by FIGS. 17 through 19, parallel to a finger support 87, the finger unit includes two shafts 85, 85 to which finger blocks 84, 84 are attached. The fingers 82, 82 are attached to the finger blocks 84, 84 in a slightly shifted manner. A torsion spring 83, the finger support 87, a pin 89, a bushing 90 with a flange, a stopper bolt 91, a locking fit 92 and a compression spring 93 are also provided as is illustrated in FIGS. 17 through 19. As described hereinbefore, the fingers of the elevation base 66 are elevated and slide to engage with the operation lever 21. The fingers 82 are then turned about an angle of 160° to release the stopper.

When operation lever 21 is rotated by turning the finger 82, there is no problem if the operation lever 21 is in its normal locked state. While previously locked operation levers of connected carriage trains are unlocked in an orderly fashion, if for any reason a lever is already in an unlocked condition, the lever will collide with the finger 82 which is rotating to the unlocked position. In that case, since the finger 82 is supported by the torsion spring 83 in the slightly shifted finger block 84, the lever is prevented from being damaged and can be safely operated such that the finger pivots around the pin 89 even if the finger 82 collides with the already unlocked operation lever 21.

Despite using the same type of carriages, the stop positions of each of the operation levers after locking the cargo stopper 19 tend to be irregular, because the fall angle and the shaft center height of the operation lever when it is at the stop position varies carriage by carriage due to their prolonged use. For this reason, it has not been realized to automate the release of the stoppers by rotating the operation lever 21. Strikers 95, 96 are provided at the carriage side of the operation lever and detection units 100, 105 are attached to the finger turning unit 80 side of the operation lever for detecting the stopper operation lever 21 position. The release of the stopper is then automated by a signal from the operation device 10.

Figure 20:
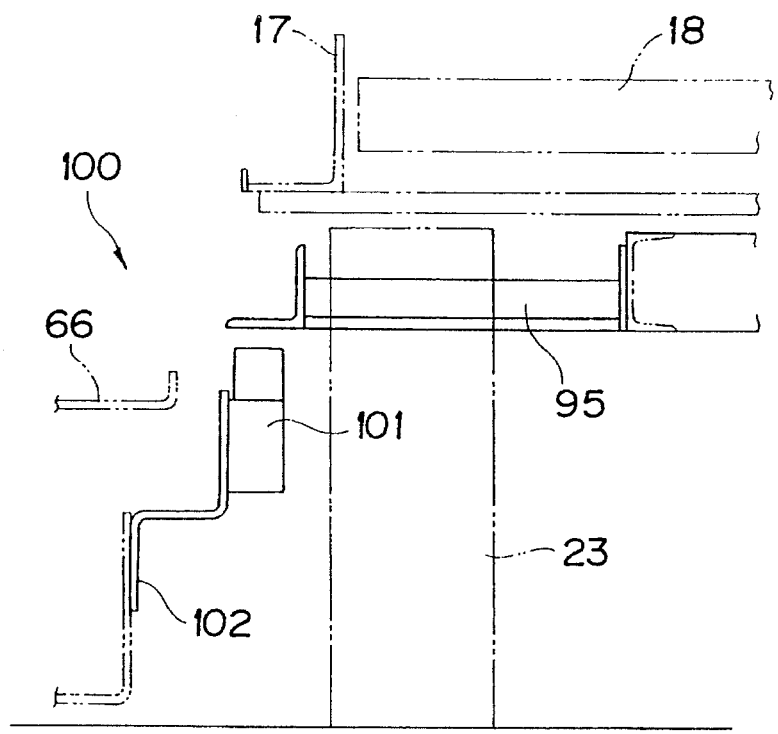
FIG. 20 is an enlarged front view illustrating the carriage position detection unit of the system.
Figure 21:
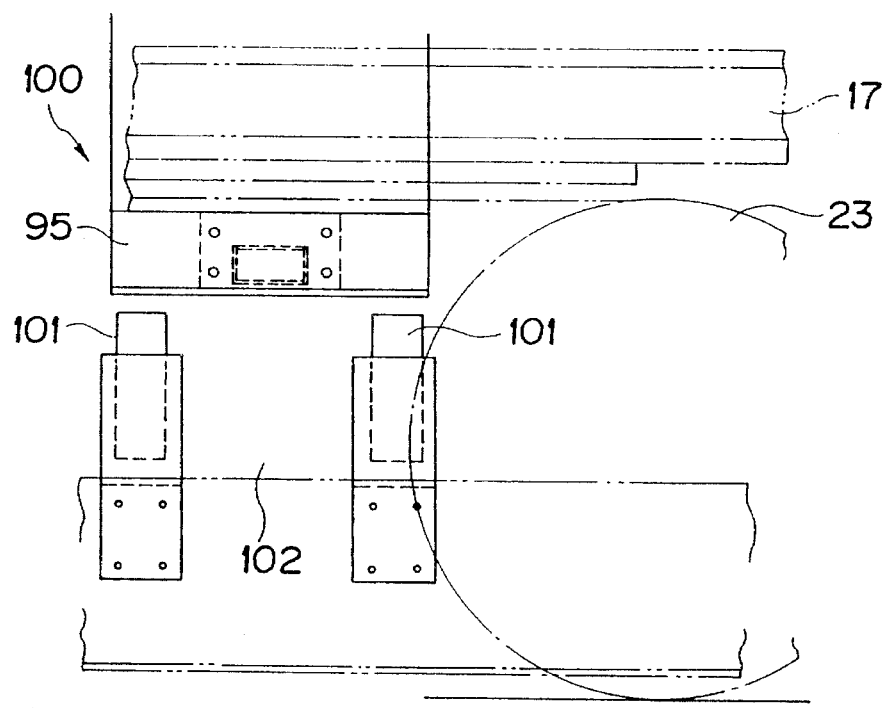
FIG. 21 is a side view illustrating the carriage position detection unit of FIG. 20.
Figure 22:
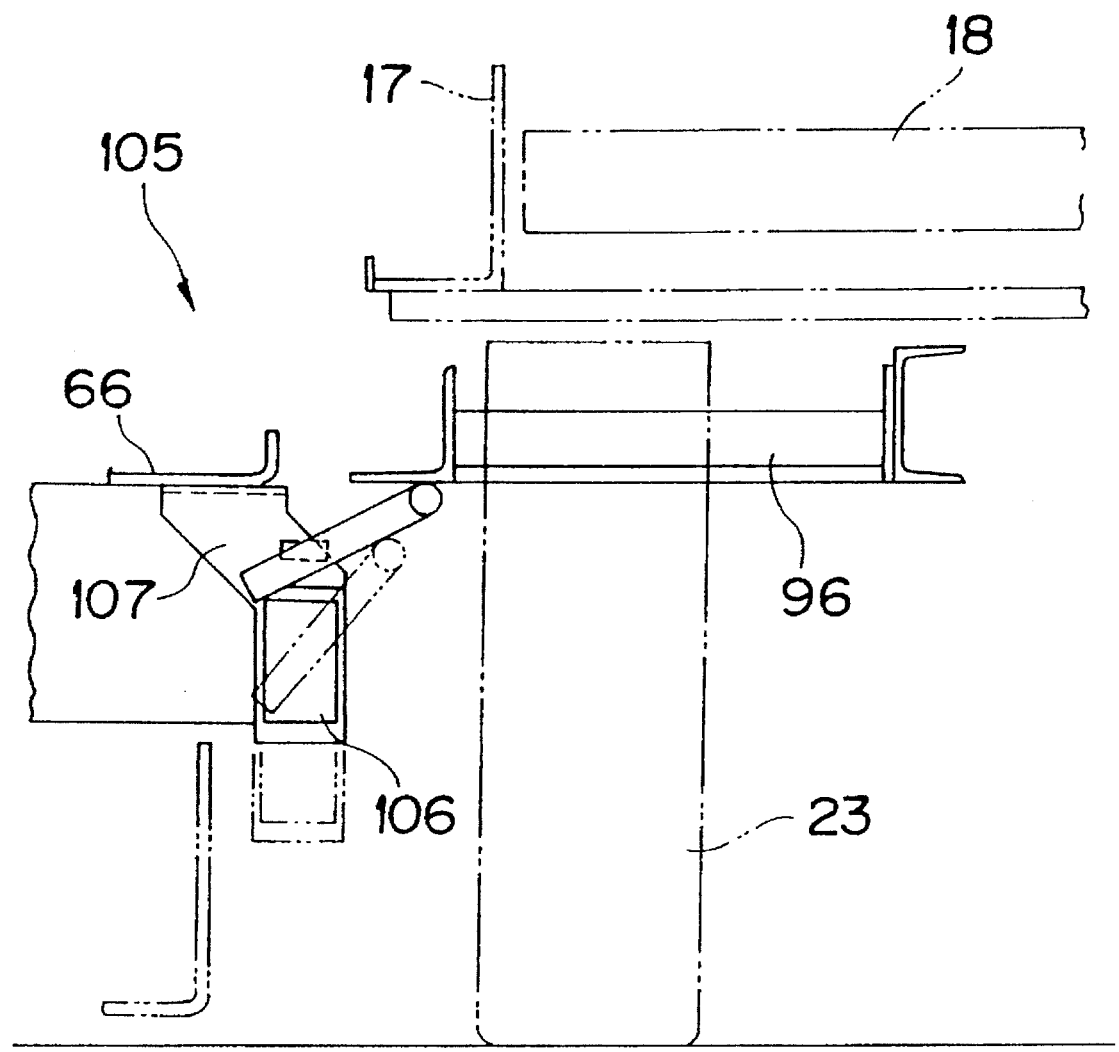
FIG. 22 is an enlarged front view illustrating the stopper operation handle height detection unit of the system.

FIG. 20 is an enlarged front view illustrating the carriage position detection unit 100 and FIG. 21 is an enlarged side view illustrating the same which comprises an adjacent switch 101, a switch bracket 102 and the carriage side striker 95. FIG. 22 is an enlarged front view illustrating an operation lever height detection unit 105 comprising a limit switch 106, a switch bracket 107 and the carriage side striker 95. When the position height accuracies of the stopper operation levers of each carriage are within a certain range, it is possible to eliminate the adjustment of heights of the operation lever height detection unit 105 and of the finger turning unit.

The function of the entire system will now be described.

UNLOADING OPERATION

Initially, in step 1, the carriage is towed to the retract position by the tug truck.

Next, in step 2, the tow projection is deployed to the retract position from the origin of the appropriate carriage retracting lane.

During step 3, the tow bar of the carriage and the tow projection are then manually connected with each other.

Next, in step 4, the operation is started and automated.

In step 5, the tow projection retracts the carriage into a desired position in the carriage retracting lane.

According to step 6, the stopper operation device advances along the lane while the carriage's position is detected, and eventually stops the travelling of the carriage.

In step 7, the height of the carriage which is the first carriage closest to the stage conveyor direction (that is, the height of the operation lever axis) is detected by the operation lever height detection unit and the stopper operation device is elevated accordingly.

In step 8, the finger base is advanced to hold the stopper operation lever by a couple of fingers.

Next, in step 9, the fingers are rotated to release the stopper of the carriage.

In step 10, the pusher device is advanced from the origin of the carriage retracting lane, and is stopped immediately before the container side to lower the paddle arm to a horizontal orientation.

In step 11, the container is then pushed by the pusher device toward the origin of the retracting lane, and is loaded on the stage conveyor 10.

In step 12, the pusher device is stopped at a particular position where the container which is loaded on the first carriage closest to the stage conveyor direction is transferred further by the cross conveyor.

The paddle arm is then pivoted to its upright position after confirming that the paddle does not collide with the container. Then, steps 7 through 11 are repeated for subsequent carriages following the first carriage to load the container on the stage conveyor. In this case, the container is pushed by the paddle to orderly run over the roller 18 of the carriage which has already been unloaded and is transferred onto the stage conveyor.

LOADING OPERATION OF CONTAINERS

Initially, in step 1, the empty carriages (6 carriages are illustrated) are retracted by the tow projection into the lane 12.

Next, in step 2, the stopper operation device is deployed from the origin of the carriage retracting lane, and the finger of the finger turning unit is engaged with the stopper operation lever and is rotated to release the stopper.

In step 3, all except the most outside stopper (toward the entrance of the lane 12) of the carriage stoppers are released. The size of the containers are preliminarily checked and only one of a couple of stoppers which fits the container size is released.

In step 4, the container waiting on the cross conveyor is pushed by the paddle arm, and consequently is advanced and loaded on respective carriages. The containers are thus transferred and loaded in a certain position.

In step 5, the container is loaded on a certain point on the carriage and is then secured by the stopper which is opposite to the carriage entrance of the retracting lane (closest to the origin of the retracting lane and farthest from the aircraft).

In step 6, the paddle arm is pivoted to its upright position to return the pusher device to the origin of the retracting lane 12. Simultaneously the stopper operation device then travels toward the subsequent carriage.

The steps 4 to 6 are then repeated, until all the containers for the carriages have been loaded. After loading all the containers on the carriages, the engagement of the tow bar and the tow projection is manually released.

The tug truck and the carriage are then manually engaged with each other and connected carriages are transferred to the aircraft.

What is claimed is:

1. An automated container transferring and loading system comprising:

at least one stage conveyor for transporting containers to a system capable of classifying, transferring and sorting containers;

a plurality of carriage retracting lanes extending from said at least one stage conveyor;

a carriage tow device for retracting a plurality of connected carriages into respective ones of said plurality of carriage retracting lanes, said plurality of connected carriages having at least one stopper arranged thereon for securing containers on said plurality of connected carriages;

at least one stopper operation device for selectively locking and unlocking said at least one stopper of said connected carriages when said connected carriages are stopped in one of said plurality of retracting lanes, said at least one stopper operation device being longitudinally movable along one side of the plurality of carriage retracting lanes; and a pusher device for unloading containers from carriages stopped in said plurality of retracting lanes onto said at least one stage conveyor, and for loading containers from said at least one stage conveyor onto carriages stopped in said plurality of retracting lanes, said pusher device being longitudinally movable along another side of the plurality of carriage retracting lanes.

2. The automated container transferring and loading system as defined in claim 1, wherein said at least one stopper operation device comprises a trolley capable of travelling parallel to the carriage tow device, an actuating device for reciprocating the trolley, a device for automatically detecting the position of a stopper operation lever of the carriage, and a finger turning unit for rotating the stopper operation lever, and wherein the finger turning unit comprises a finger rotation device and slightly shifted fingers for rotating said stopper operation levers on said carriages.

3. The automated container transferring and loading system as defined in claim 2, wherein each carriage is provided with:

a plurality of rollers arranged parallel to one another in a turn table which is rotatably attached to each carriage, said at least one stopper being liftably disposed between some of said plurality of rollers at a position which can be adjusted according to container size to thereby prevent container chattering;

a turn table frame;

a stopper operation lever being attached at opposite sides of the turn table frame and adjacent to each stopper;

a shaft of the operation lever extending in parallel with the plurality of rollers to connect with each stopper;

a connecting plate provided fore and aft of the carriages, for connecting the carriages to one another, said connecting plate having an aperture for engaging the tow projection; and a wheel guide disposed along a floor board for guiding the carriage wheels.

4. The automated container transferring and loading system as defined in claim 2, wherein the device for automatically detecting a position of a stopper operation lever comprises a striker mounted on the carriage and a detector for detecting at least the planar position of a stopper operation lever which abuts the striker.

5. The automated container transferring and loading system as defined in claim 1, wherein the pusher device comprises:

a trolley which travels parallel to the stopper operation device with the carriage tow device having a path of travel arranged between and in parallel with the pusher device and the stopper operation device;

an actuating device for reciprocating the trolley;

a paddle arm pivotally disposed on the trolley; and a paddle arm pivoting unit for selectively pivoting said paddle arm between a horizontal orientation and an upright orientation.

6. The automated container transferring and loading system as defined in claim 1, wherein said at least one stage conveyor comprises a plurality of connected cross conveyors.

7. The automated container transferring and loading system as defined in claim 1, wherein said plurality of carriage retracting lanes include a pit provided coextensively with each of said plurality of carriage retracting lanes, three rails being disposed longitudinally inside each pit, and two sets of columns being provided within each pit for supporting the weight of said connected carriages, a first of said three rails being disposed along the lateral center of the pit for guiding the carriage tow device, while a second and a third of said three rails are disposed adjacent said sets of columns in order to guide the pusher device and the stopper operation device, each of said three rails further comprising a chain inserted therein for propelling the carriage tow device, the pusher device and the stopper operation device and a chain actuation device disposed at each of the rails.

8. The automated container transferring and loading system as defined in claim 1, wherein each carriage is provided with:

a plurality of rollers arranged parallel to one another in a turn table which is rotatably attached to each carriage, said at least one stopper being liftably disposed between some of said plurality of rollers at a position which can be adjusted according to container size to thereby prevent container chattering;

a turn table frame;

a stopper operation lever being attached at opposite sides of the turn table frame and adjacent to each stopper;

a shaft of the operation lever extending in parallel with the plurality of rollers to connect with each stopper;

a connecting plate provided fore and aft of the carriages, for connecting the carriages to one another, said connecting plate having an aperture for engaging the tow projection; and a wheel guide disposed along a floor board for guiding the carriage wheels.

9. The automated container transferring and loading system as defined in claim 1, wherein said carriage tow device includes a trolley and a tow projection extending out from a slit disposed along the center of a floor board which defines the floor of said plurality of retracting lanes, said tow projection being arranged on the trolley so as to engage a connecting plate attached to the carriage, a release lever being attached near the connecting plate to disengage the connecting plate from the tow projection, said trolley being arranged for travel along a rail by way of chain actuation.

10. The automated container transferring and loading system as defined in claim 9, wherein a short pole is disposed upright at a first end of the trolley while a tow fitting is mounted to a bracket disposed on said short pole, said tow projection being urged upwardly by spring action so that the tow projection always tends to engage the tow bar aperture, and wherein the releasing lever is arranged for releasing the engagement of the tow bar and the tow projection when the carriage reaches an innermost point in said plurality of retracting lanes.

11. The automated container transferring and loading system as defined in claim 1, wherein the pusher device comprises a frame disposed on a travelling base, a geared motor disposed on said frame and a paddle arm pivotally supported by a rotatable shaft, said paddle arm being vertically oriented when the pusher device moves longitudinally up or down the plurality of retracting lanes and being horizontally oriented when cargo on a carriage is to be pushed toward said at least one stage conveyor for unloading purposes or pushed away from said at least one stage conveyor for loading onto the carriage.

12. The automated container transferring and loading system as defined in claim 1, wherein:

the stopper operation device is movable longitudinally with respect to said at least one carriage retracting lane for properly engaging a stopper rotatable finger to a stopper operation lever before cargo on one of said plurality of carriages can be unloaded, and includes a pair of elevating mechanisms disposed at lateral sides of a travelling base, elevation bases and a slide mechanism;

said elevation bases are supported by four dampers which are arranged upright on the travelling base and include two finger turning units on an upper surface thereof, said elevation mechanism comprising a geared motor mounted on the travelling base, a rotatable shaft connected to an output shaft of the geared motor, a cam plate fixed on the rotatable shaft and a corresponding roller disposed under each elevation base to contact said cam plate, the position of the stopper operation lever and its height from the floor being confirmed by a position detecting unit and a height detecting unit, each elevation base being elevatable by rotating the cam plate via the geared motor to thereby close any gap between the height of the lever and that of the finger turning units;

said slide mechanism is used to slide the finger turning unit to properly engage the fingers on the elevation base to the operation lever, said slide mechanism comprising several guides provided on the elevation base for guiding a slide base, a slide motor being provided on said slide base, a pinion protruding from under said slide base to engage with a rack, a gaging unit and the slide motor being provided on said slide base, so that a certain distance between the carriage turning table and the elevation base is maintained and the finger turning unit slides via the pinion and the rack in response to an actuation of said slide motor; and said finger unit comprises a geared motor for turning the fingers, said geared motor for turning the fingers being provided on the slide base, an arm being attached to a shaft of said geared motor for turning, a finger unit being provided at an end of said arm, said finger unit including a finger support secured to the arm, two shafts which are arranged parallel to the finger support, finger blocks elastically inserted into said two shafts, and fingers mounted in said finger blocks but shifted with respect to one another.

13. An automated container transferring and loading system as defined in claim 1, wherein said plurality of carriage retracting lanes include a pit provided coextensively with each of said plurality of carriage retracting lanes, three rails being disposed longitudinally inside each pit, and two sets of columns being provided within each pit for supporting the weight of said connected carriages, a first of said three rails being disposed along the lateral center of the pit for guiding the carriage tow device, while a second and a third of said three rails are disposed adjacent said sets of columns in order to guide the pusher device and the stopper operation device, each of said three rails further comprising a chain inserted therein for propelling the carriage tow device, the pusher device and the stopper operation device and a chain actuation device disposed at ends of the rails.

14. The automated container transferring and loading system as defined in claim 1, and further comprising a device for automatically detecting a position of a stopper operation lever, including a striker mounted on the carriage and a detector for detecting at least the planar position of a stopper operation lever which abuts the striker.

15. An automated container transferring and loading system comprising:

at least one stage conveyor for transporting containers to a system capable of classifying, transferring and sorting containers;

a plurality of carriage retracting lanes extending from said at least one stage conveyor;

a carriage tow device for retracting a plurality of connected carriages into respective ones of said plurality of carriage retracting lanes, said plurality of connected carriages having at least one stopper arranged thereon for securing containers on said plurality of connected carriages;

at least one stopper operation device for selectively locking and unlocking said at least one stopper of said connected carriages when said connected carriages are stopped in one of said plurality of retracting lanes; and a pusher device for unloading containers from carriages stopped in said plurality of retracting lanes onto said at least one stage conveyor, and for loading containers from said at least one stage conveyor onto carriages stopped in said plurality of retracting lanes;

wherein said at least one stopper operation device comprises a trolley capable of travelling parallel to the carriage tow device, an actuating device for reciprocating the trolley, a device for automatically detecting the position of a stopper operation lever of the carriage, and a finger turning unit for rotating the stopper operation lever, and wherein the finger turning unit comprises a finger rotation device and slightly shifted fingers for rotating said stopper operation levers on said carriages.

16. The automated container transferring and loading system as defined in claim 15, wherein each carriage is provided with:

a plurality of rollers arranged parallel to one another in a turn table which is rotatably attached to each carriage, said at least one stopper being liftably disposed between some of said plurality of rollers at a position which can be adjusted according to container size to thereby prevent container chattering;

a turn table frame;

said stopper operation levers being attached at opposite sides of the turn table frame and adjacent to each stopper;

a shaft of each operation lever extending in parallel with the plurality of rollers to connect with a respective one of the stoppers;

a connecting plate provided fore and aft of the carriages, for connecting the carriages to one another, said connecting plate having an aperture for engaging the tow projection; and a wheel guide disposed along a floor board for guiding the carriage wheels.

17. The automated container transferring and loading system as defined in claim 15, wherein the device for automatically detecting a position of a stopper operation lever comprises a striker mounted on the carriage and a detector for detecting at least the planar position of a stopper operation lever which abuts the striker.

18. An automated container transferring and loading system comprising:

at least one stage conveyor for transporting containers to a system capable of classifying, transferring and sorting containers;

a plurality of carriage retracting lanes extending from said at least one stage conveyor;

a carriage tow device for retracting a plurality of connected carriages into respective ones of said plurality of carriage retracting lanes, said plurality of connected carriages having at least one stopper arranged thereon for securing containers on said plurality of connected carriages;

at least one stopper operation device for selectively locking and unlocking said at least one stopper of said connected carriages when said connected carriages are stopped in one of said plurality of retracting lanes; and a pusher device for unloading containers from carriages stopped in said plurality of retracting lanes onto said at least one stage conveyor, and for loading containers from said at least one stage conveyor onto carriages stopped in said plurality of retracting lanes, wherein the pusher device comprises:

a trolley which travels parallel to the stopper operation device with the carriage tow device having a path of travel arranged between and in parallel with the pusher device and the stopper operation device;

an actuating device for reciprocating the trolley;

a paddle arm pivotally disposed on the trolley; and a paddle arm pivoting unit for selectively pivoting said paddle arm between a horizontal orientation and an upright orientation.

19. An automated container transferring and loading system comprising:

at least one stage conveyor for transporting containers to a system capable of classifying, transferring and sorting containers, said at least one stage conveyor including a plurality of connected cross conveyors;

a plurality of carriage retracting lanes extending from said at least one stage conveyor;

a carriage tow device for retracting a plurality of connected carriages into respective ones of said plurality of carriage retracting lanes, said plurality of connected carriages having at least one stopper arranged thereon for securing containers on said plurality of connected carriages;

at least one stopper operation device for selectively locking and unlocking said at least one stopper of said connected carriages when said connected carriages are stopped in one of said plurality of retracting lanes; and a pusher device for unloading containers from carriages stopped in said plurality of retracting lanes onto said at least one stage conveyor, and for loading containers from said at least one stage conveyor onto carriages stopped in said plurality of retracting lanes.

20. An automated container transferring and loading system comprising:

at least one stage conveyor for transporting containers to a system capable of classifying, transferring and sorting containers;

a plurality of carriage retracting lanes extending from said at least one stage conveyor;

a carriage tow device for retracting a plurality of connected carriages into respective ones of said plurality of carriage retracting lanes, said plurality of connected carriages having at least one stopper arranged thereon for securing containers on said plurality of connected carriages;

at least one stopper operation device for selectively locking and unlocking said at least one stopper of said connected carriages when said connected carriages are stopped in one of said plurality of retracting lanes; and a pusher device for unloading containers from carriages stopped in said plurality of retracting lanes onto said at least one stage conveyor, and for loading containers from said at least one stage conveyor onto carriages stopped in said plurality of retracting lanes, wherein said plurality of carriage retracting lanes include a pit provided coextensively with each of said plurality of carriage retracting lanes, three rails being disposed longitudinally inside each pit, and two sets of columns being provided within each pit for supporting the weight of said connected carriages, a first of said three rails being disposed along the lateral center of the pit for guiding the carriage tow device, while a second and a third of said three rails are disposed adjacent said sets of columns in order to guide the pusher device and the stopper operation device, each of said three rails further comprising a chain inserted therein for propelling the carriage tow device, the pusher device and the stopper operation device and a chain actuation device disposed at each of the rails.

21. An automated container transferring and loading system comprising:

at least one stage conveyor for transporting containers to a system capable of classifying, transferring and sorting containers;

a plurality of carriage retracting lanes extending from said at least one stage conveyor;

a carriage tow device for retracting a plurality of connected carriages into respective ones of said plurality of carriage retracting lanes, said plurality of connected carriages having at least one stopper arranged thereon for securing containers on said plurality of connected carriages;

at least one stopper operation device for selectively locking and unlocking said at least one stopper of said connected carriages when said connected carriages are stopped in one of said plurality of retracting lanes; and a pusher device for unloading containers from carriages stopped in said plurality of retracting lanes onto said at least one stage conveyor, and for loading containers from said at least one stage conveyor onto carriages stopped in said plurality of retracting lanes, wherein the pusher device comprises a frame disposed on a travelling base, a geared motor disposed on said frame and a paddle arm pivotally supported by a rotatable shaft, said paddle arm being vertically oriented when the pusher device moves longitudinally up or down the plurality of retracting lanes and being horizontally oriented when cargo on a carriage is to be pushed toward said at least one stage conveyor for unloading purposes or pushed away from said at least one stage conveyor for loading onto the carriage.

22. An automated container transferring and loading system comprising:

at least one stage conveyor for transporting containers to a system capable of classifying, transferring and sorting containers;

a plurality of carriage retracting lanes extending from said at least one stage conveyor;

a carriage tow device for retracting a plurality of connected carriages into respective ones of said plurality of carriage retracting lanes, said plurality of connected carriages having at least one stopper arranged thereon for securing containers on said plurality of connected carriages;

at least one stopper operation device for selectively locking and unlocking said at least one stopper of said connected carriages when said connected carriages are stopped in one of said plurality of retracting lanes; and a pusher device for unloading containers from carriages stopped in said plurality of retracting lanes onto said at least one stage conveyor, and for loading containers from said at least one stage conveyor onto carriages stopped in said plurality of retracting lanes, wherein:

the stopper operation device is movable longitudinally with respect to said at least one carriage retracting lane for properly engaging a stopper rotatable finger to a stopper operation lever before cargo on one of said plurality of carriages can be unloaded, and includes a pair of elevating mechanisms disposed at lateral sides of a travelling base, elevation bases and a slide mechanism;

said elevation bases are supported by four dampers which are arranged upright on the travelling base and include two finger turning units on an upper surface thereof, said elevation mechanism comprising a geared motor mounted on the travelling base, a rotatable shaft connected to an output shaft of the geared motor, a cam plate fixed on the rotatable shaft and a corresponding roller disposed under each elevation base to contact said cam plate, the position of the stopper operation lever and its height from the floor being confirmed by a position detecting unit and a height detecting unit, each elevation base being elevatable by rotating the cam plate via the geared motor to thereby close any gap between the height of the lever and that of the finger turning units;

said slide mechanism is used to slide the finger turning unit to properly engage the fingers on the elevation base to the operation lever, said slide mechanism comprising several guides provided on the elevation base for guiding a slide base, a slide motor being provided on said slide base, a pinion protruding from under said slide base to engage with a rack, a gaging unit and the slide motor being provided on said slide base, so that a certain distance between the carriage turning table and the elevation base is maintained and the finger turning unit slides via the pinion and the rack in response to an actuation of said slide motor; and said finger unit comprises a geared motor for turning the fingers, said geared motor for turning the fingers being provided on the slide base, an arm being attached to a shaft of said geared motor for turning, a finger unit being provided at an end of said arm, said finger unit including a finger support secured to the arm, two shafts which are arranged parallel to the finger support, finger blocks elastically inserted into said two shafts, and fingers mounted in said finger blocks but shifted with respect to one another.

* * * * *